UNITED STATES PATENT OFFICE.

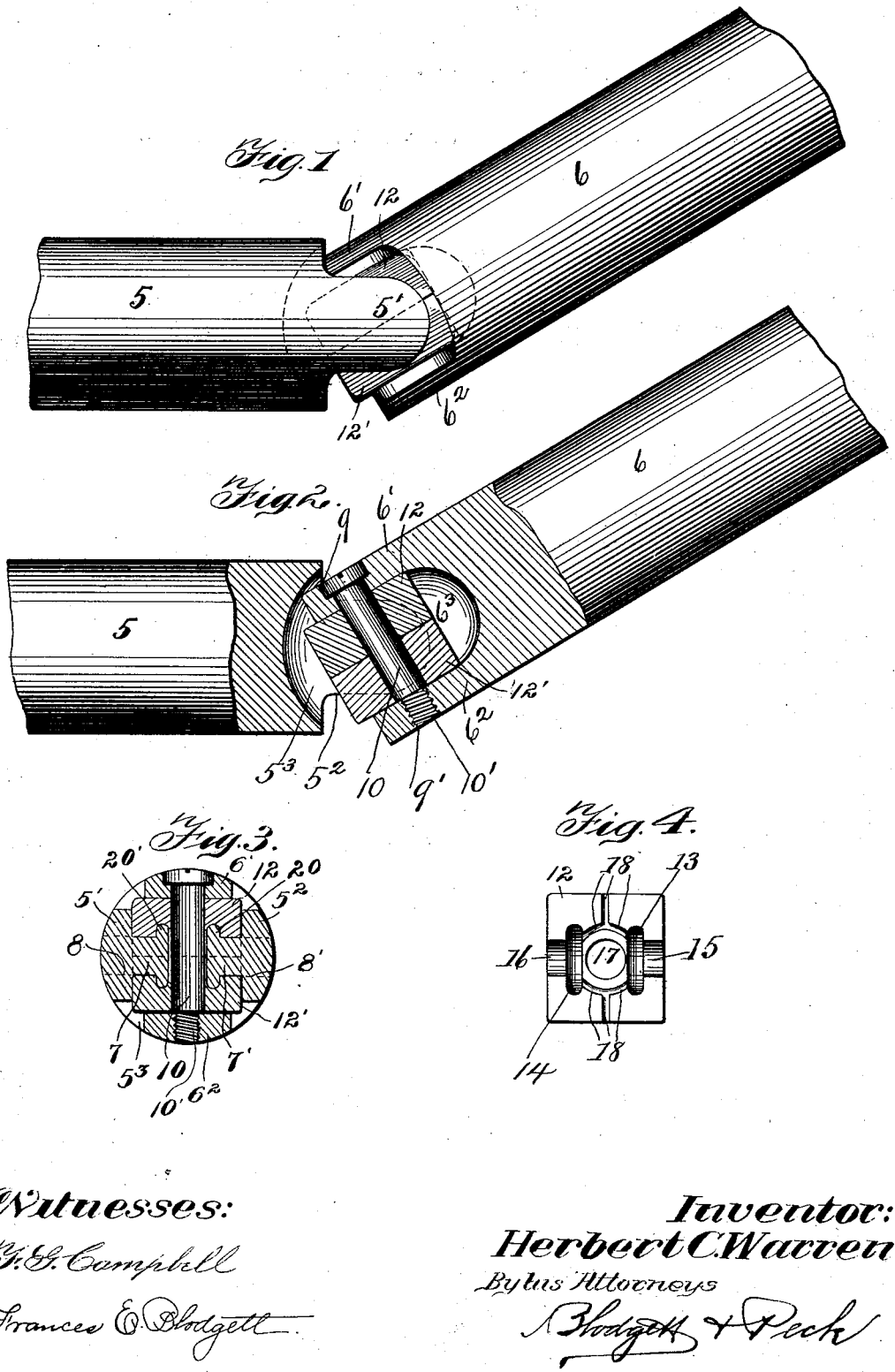

HERBERT C. WARREN, OF HARTFORD, CONNECTICUT.

UNIVERSAL JOINT.

SPECIFICATION forming part of Letters Patent No. 699,904, dated May 13, 1902.

Application filed January 6, 1902. Serial No. 88,594. (No model.)

*To all whom it may concern:*

Be it known that I, HERBERT C. WARREN, a citizen of the United States, residing at Hartford, in the county of Hartford and State of Connecticut, have invented certain new and useful Improvements in Universal Joints, of which the following is a specification.

My invention relates to universal joints; and it has for its object the provision of a device of this character simple and strong in construction and composed of but few parts which can be cheaply manufactured and may be readily assembled with a minimum expenditure of time and labor.

A further object of the invention is the provision in a universal joint of blocks of peculiar construction and connected to the ends of the shafting in a distinctive way, all as will be hereinafter described.

In the accompanying drawings, Figure 1 is a side elevation of my improved universal joint. Fig. 2 is a similar view with the ends of the shafting and with the uniting-blocks in section. Fig. 3 is a sectional view taken on the line of the pin for securing the rocking blocks in position, said blocks and the bifurcated end of one of the shafts being in section; and Fig. 4 is a plan view of the inner side of one of the blocks.

Like numerals designate similar parts throughout the several views.

Referring to the drawings, the numeral 5 designates a shaft provided at its ends with arms 5' 5² and with a concavity 5³, and the numeral 6 another shaft having arms 6' 6² and a concavity 6³. These arms and the concavity may be formed on the ends of the shafts in any desired manner—for instance, by removing the metal or by casting, if desired. Inwardly projecting from the arms 5' 5² are headed studs 7 7', as illustrated in Fig. 3, and the shanks or barrels of these studs are shown by dotted lines 8 8' in Fig. 3 as passing through said arms; but other modes of attachment may be adopted, if desired. The arms 6' 6² of shaft 6 are perforated at 9 9', respectively, for the reception of a bolt 10, hereinafter described, said bolt being threaded at 10' at one of its ends to enter a nut formed in the arm 6², as illustrated in Fig. 2.

Designated by the numerals 12 12' are blocks, and these blocks are provided on their inner faces with semicircular grooves 13 and 14, respectively, and with shallow semicircular grooves 15 and 16, respectively. Each block is also perforated at 17 for a purpose hereinafter set forth and is provided with shallow passages or grooves 18, which may be arranged in any desired manner for the reception of oil or other lubricant. The heads of the studs or pins 7 7' are designated, respectively, by the numerals 20 and 20' and are of a conformation suitable to be received in the semicircular grooves 13 and 14 of the blocks, the shanks of said studs fitting in the shallow grooves 15 and 16, as illustrated in Fig. 3. The two sections 12 and 12' constitute, when placed upon the studs in the manner described and as illustrated in Fig. 3, a connecting-block, and in order to assemble the parts of the joint these sections are first fitted over the headed studs. The furcated end of the shaft 6 is then placed in position over said connecting-block until the perforations 9 9' of the arms 6' 6² are in line with the central opening 17 of said block, and the bolt 10 is then passed through the alined openings in the arms and connecting-block and bears against the faces of the heads 20 20' of studs 7 7', and said bolt is then turned to cause its threaded end to engage with the threaded walls or nut of said opening 9', as illustrated in Fig. 2. This construction provides a very simple and convenient joint, one that can be readily and cheaply manufactured, and which will be easy in operation and effective for all of the purposes for which said joints are usually employed.

To permit the rocking or turning movement of the connecting-block, the concavities 5³ 6³ are provided, and to enable the shaft-sections to turn upon said block the arms 6' 6² of shaft 6 swing upon the bolt 10 and the arms 5' 5², carrying the headed studs 7 7', swing upon the connecting-block, said studs readily rocking within the grooves 13, 14, 15, and 16 of said block. In this way by a simple and cheap construction composed of few parts and capable of being manufactured by machinery or by casting a universal joint is provided the parts of which may be readily assembled and disassembled and which will permit the shafts united by said joint to be moved with ease and facility in any desired direction.

As will be observed by reference to Figs. 1 and 3, the parts of my improved universal joint are all locked together, and inasmuch as the surface or periphery of the bolt 10 bears against the heads 20 20' and as said bolt passes through both the arms 6' 6² of shaft 6 and the sections of the block a compact construction is provided, one which will not yield when end thrust is applied to either of the shaft-sections and which will readily and easily conform to the motion or position of either of said shaft-sections.

My invention is not limited to the precise details of construction illustrated and described, to the form of the sections of the connecting-block, nor to the specific grooves and studs described for uniting said block with the shaft, for many changes may be made therein without departure from the invention.

Having thus described my invention, what I claim, and desire to obtain by Letters Patent, is—

1. In a universal joint, the combination, with a furcated shaft having headed studs, of a sectional connecting-block having grooves for the reception of the heads of said studs; a second shaft; and means for uniting said second shaft to said connecting-block.

2. In a universal joint, the combination, with a shaft having inwardly-projecting arms, of headed studs carried by said arms; a sectional connecting-block fitted to said studs, each section being grooved to receive the studs; a second shaft having projecting arms; and means for uniting the shafts and sectional connecting-block.

3. In a universal joint, the combination, with a shaft having arms; of headed studs projecting inwardly from said arms; a sectional connecting-block, each section having grooves for the reception of the heads and shanks of said studs; a second shaft; and means for uniting said second shaft to the connecting-block.

4. In a universal joint, the combination, with a shaft having arms at its end, of headed studs carried by said arms; a sectional connecting-block having grooves for the reception of said studs, each section of said block being perforated; a second shaft having perforated arms; and a bolt for securing said shaft to the connecting-block, said bolt passing through the alined perforations of the connecting-blocks.

5. In a universal joint, the combination, with a shaft having arms, of headed studs carried by said arms; a sectional connecting-block having grooves for the reception of said headed studs, each of the sections of said block being perforated; a second shaft having perforated arms; and means passing through the perforations of said arms and block for securing the parts together.

6. In a universal joint, the combination, with a shaft having arms, of headed studs carried by said arms; a sectional connecting-block, the sections of said block having grooves for the reception of the headed studs and being perforated; a second shaft having perforated arms, one of which is threaded; and a bolt having a thread at one of its ends for engaging with said threaded arm, said bolt passing through the perforations of the sectional connecting-block and serving to unite the parts, substantially as set forth.

7. In a universal joint, the combination, with a shaft concaved at its end and having arms, of laterally-projecting, headed studs carried by said arms; a sectional connecting-block, each section of the block having grooves for the reception of the studs and also having lubricating passages, and each of said sections being perforated; a second shaft concaved at its end and having perforated arms, one of said arms being internally threaded; and a bolt having a screw-thread at its end, and serving to unite said shaft with the connecting-block.

8. The combination, with devices having furcated ends, of studs, each having a projection, carried by one of said devices; a sectional block, each section of which is shaped to receive the studs and is also perforated; and a bolt passing through one of the furcated devices and through the sectional block, said bolt bearing against the projections of the studs.

9. The combination, with devices, each having a pair of arms, one pair of said arms being perforated, of devices extending laterally from the other pair of said arms, said devices having projections; a sectional block having grooves to receive the projections, each section of said block being perforated; and a bolt passing through the perforations of the arms and block-sections and bearing against said projections.

In testimony whereof I affix my signature in presence of two witnesses.

HERBERT C. WARREN.

Witnesses:
FRANCIS E. BLODGETT,
FRANK G. CAMPBELL.